US009702761B2

United States Patent
Antonini et al.

(10) Patent No.: US 9,702,761 B2
(45) Date of Patent: Jul. 11, 2017

(54) SYSTEM AND METHOD FOR TEMPERATURE MONITORING IN A ROOM

(75) Inventors: Roberto Antonini, Turin (IT); Felice Fulvio Faraci, Turin (IT); Marco Gaspardone, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 555 days.

(21) Appl. No.: 14/359,162

(22) PCT Filed: Dec. 21, 2011

(86) PCT No.: PCT/EP2011/073625
§ 371 (c)(1),
(2), (4) Date: May 19, 2014

(87) PCT Pub. No.: WO2013/091692
PCT Pub. Date: Jun. 27, 2013

(65) Prior Publication Data
US 2014/0334519 A1    Nov. 13, 2014

(51) Int. Cl.
| | |
|---|---|
| *G01K 1/00* | (2006.01) |
| *G01J 5/10* | (2006.01) |
| *G01K 1/14* | (2006.01) |
| *G01K 7/42* | (2006.01) |
| *G01J 5/00* | (2006.01) |

(52) U.S. Cl.
CPC ............. *G01J 5/10* (2013.01); *G01K 1/143* (2013.01); *G01K 7/42* (2013.01); *G01J 2005/0085* (2013.01); *G01J 2005/0092* (2013.01); *G01K 2213/00* (2013.01)

(58) Field of Classification Search
None
See application file for complete search history.

(56) References Cited

U.S. PATENT DOCUMENTS

| | | | |
|---|---|---|---|
| 2005/0008215 A1 | 1/2005 | Shepard | |
| 2007/0032979 A1* | 2/2007 | Hamann | G01K 1/026 702/130 |
| 2007/0235550 A1* | 10/2007 | Donath | G01K 17/06 237/1 R |
| 2008/0239539 A1 | 10/2008 | Hamann et al. | |
| 2008/0281551 A1 | 11/2008 | Hamann et al. | |
| 2010/0079282 A1* | 4/2010 | Icove | G01K 11/006 340/561 |
| 2014/0039825 A1 | 2/2014 | Antonini et al. | |
| 2014/0257740 A1* | 9/2014 | Hamann | G01K 1/02 702/130 |

(Continued)

OTHER PUBLICATIONS

International Search Report Issued Dec. 18, 2012 in PCT/EP11/072625 Filed Dec. 21, 2011.

*Primary Examiner* — Mirellys Jagan
(74) *Attorney, Agent, or Firm* — Oblon, McClelland, Maier & Neustadt, L.L.P.

(57) ABSTRACT

A method for monitoring a temperature of a survey surface in a room. The method includes: providing a number of temperature sensors coupled to the survey surface; receiving from the number of temperature sensors respective temperature values; applying an extrapolation model to the received temperature values and extrapolating an extrapolated thermographic scan of the survey surface; and monitoring the temperature of the survey surface on the basis of the extrapolated thermographic scan.

16 Claims, 8 Drawing Sheets

(56) References Cited

U.S. PATENT DOCUMENTS

2015/0276495 A1* 10/2015 Smullin ................. G01K 3/04
 702/130
2015/0300892 A1* 10/2015 Malhotra ............... G01K 13/00
 700/276

* cited by examiner

SYSTEM AND METHOD FOR TEMPERATURE MONITORING IN A ROOM

TECHNICAL FIELD

The present invention generally relates to the field of temperature monitoring systems. In particular, the present invention relates to a system and a method for monitoring the temperature of a surface in a room such as a Data Center comprising one or more racks of telecommunication and/or processing equipments, e.g. servers.

BACKGROUND ART

As known, a Data Center is a room which is typically adapted to host a high number of computing and/or telecommunication apparatuses, as, for example, servers, routers, switches, and the like. These apparatuses are typically mounted into racks which are arranged in rows inside the Data Center.

The computing and/or telecommunication apparatuses comprised within a Data Center, during their operation, produce heat. Such heat is typically forced to leave the apparatus through a cooling grid provided on its case. Then, the heat produced by the apparatuses warms up the air within the Data Center and the room temperature may reach very high values. In particular, the air temperature may reach values that may be critical as they may cause malfunctioning of the computing and/or telecommunication apparatuses.

Typically, a Data Center comprises systems for maintaining the room temperature below a certain value, in particular cooling systems (for instance, air-conditioning systems) for maintaining the room temperature below a predetermined threshold guaranteeing the safe and correct functioning of the computing and/or telecommunication apparatuses. In order to operate the cooling systems, is then necessary to provide the Data Center with a temperature monitoring system capable of sensing the room temperature and detecting when and where the room temperature increases above the threshold.

A temperature monitoring system for monitoring the temperature of the apparatuses comprised in a room, and, in particular, the temperature onto given surfaces within the room, may comprise a few temperature sensors located at certain positions within the room. Each sensor detects a single value of the temperature corresponding to the temperature at that location. Moreover, typically, such a detection is discrete in time. The fixed sensors are connected to a control unit that typically processes the detected temperature values and operates possible cooling systems if the temperature detected by one or more sensors increases above a safety threshold.

Alternatively, one infrared or thermographic camera may be used to monitor the temperature of a surface in a room. The thermographic camera typically acquires a thermographic scan of a surface to be monitored, the scan being a two-dimensional matrix of temperature values relative to a grid of pixels of the surface. Indeed, the thermographic camera is usually implemented as a two-dimensional matrix of temperature sensors, such as microbolometers, which are capable to detect the infrared radiation emitted by the materials present within the surface. The infrared radiation is detected by the sensors of the camera and is processed to provide the thermographic scan. The values of the infrared radiation detected by the camera are further processed to provide an image of the surface, typically a grayscale image or a false color image, in which the gray tone or the color associated to each pixel represents the temperature sample value at the corresponding position of the pixel in the surface.

US 2005/0008215 A1 discloses a system comprising an infrared camera for determining a time response of a monotonically changing characteristic of a sample by obtaining a series of sample images over time.

SUMMARY OF THE INVENTION

The inventors have noticed that the temperature monitoring systems cited above have some drawbacks.

Indeed, the system comprising the fixed temperature sensors does not allow accurately monitoring the temperature when such temperature is rapidly variable in space and time. In principle, in order to provide a higher accuracy, it would be necessary to locate, within the room, a very high number of sensors, or to change the position of the sensors according to the time-varying spatial distribution of the temperature values within the room. In both cases, disadvantageously, the system would be too complex and too expensive to implement.

On the other hand, the system comprising one thermographic camera would allow monitoring the variation of the temperature on a surface of the room with greater detail than the system cited above, but it is disadvantageously very expensive.

In view of the above, the inventors have addressed the problem of providing a method and a system for monitoring the temperature of a surface in a room such as a Data Center which solve the drawbacks mentioned above. In particular, the inventors have addressed the problem of providing a method and a system for monitoring the temperature which provide a degree of detail substantially comparable with the detail provided by the thermographic camera and with a cost substantially comparable to that of a system of few fixed temperature sensors.

In the present description and in the claims, the surface to be monitored will be typically referred to as "survey surface" and it may comprise surface portions of the apparatus(es) comprised within the room. In case of a Data Center, the survey surface may comprise the front or rear surface portions of a single rack or of a row of racks.

Moreover, in the present description and in the claims, the expression "sensors coupled to the survey surface" will designate sensors that are associated to the survey surface in the sense that they may be positioned on the survey surface or in proximity of the survey surface.

According to a first aspect, the present invention provides a method for monitoring the temperature of a survey surface in a room, such method comprising:

a) providing a number, N, of temperature sensors coupled to the survey surface;
b) receiving from the number of temperature sensors respective temperature values;
c) applying an extrapolation model to the received temperature values and extrapolating an extrapolated thermographic scan of the survey surface; and
d) monitoring the temperature of the survey surface on the basis of the extrapolated thermographic scan.

Preferably, the method further comprises, at a number, K, of discrete time instants belonging to a sample collection period, receiving first temperature values from said number N of temperature sensors and corresponding sample thermographic scans, each of the sample thermographic scans comprising a matrix of second temperature values sensed at a number, P×Q, of pixels of the survey surface.

Preferably, the method further comprises computing extrapolation coefficients of the extrapolation model based on the first temperature values and the second temperature values of the corresponding sample thermographic scans.

Preferably, the step of computing comprises, for each of the number of pixels, associating the pixel with a respective temperature sensor and interpolating the second temperature values corresponding to the pixel as a function of the first temperature values corresponding to the associated temperature sensor by means of polynomials of degree equal to or higher than 1.

Preferably, the step of computing further comprises identifying a first thermal dynamics and a second thermal dynamics at the pixel and associating each of the second temperature values and the corresponding first temperature value to one of the first thermal dynamics and second thermal dynamics.

Preferably, the step of computing comprises defining and solving, for each of the number of pixels, a number K/N of systems of N linear equations, each of the linear equations connecting the second temperature value corresponding to the pixel in a time instant to the number N of first temperature values received from the number N of temperature sensors in the time instant.

Preferably, step a) further comprises receiving a first thermographic scan of the survey surface, identifying a number of areas on the survey surface and arranging the number of temperature sensors within the areas.

Preferably, the step of identifying comprises identifying a number of areas wherein a temperature is higher than a threshold.

Preferably, the method further includes processing the extrapolated thermographic scan and detecting one or more temperature anomalies.

Preferably, the method further includes generating an alarm signal and/or operating a temperature control system within the room in order to recover from the one or more temperature anomalies.

According to a second aspect, the present invention provides a temperature monitoring system for monitoring the temperature of a survey surface in a room, the system comprising:

a number, N, of temperature sensors coupled to the survey surface; and a control unit communicating with the number of temperature sensors, wherein the control unit is configured to receive from the number of temperature sensors respective temperature values; apply an extrapolation model to the received temperature values and extrapolate an extrapolated thermographic scan; and monitor the temperature of the room on the basis of the extrapolated thermographic scan.

Preferably, the temperature sensor comprises a thermocouple.

Alternatively, the temperature sensor comprises an NTC thermistor.

Preferably, the control unit is further configured to receive at least one thermographic scan of the survey surface from a thermographic camera.

Preferably, the thermographic camera is connected to the control unit.

BRIEF DESCRIPTION OF THE DRAWINGS

Embodiments of the invention will be better understood by reading the following detailed description, given by way of example and not of limitation, to be read with reference to the accompanying drawings, wherein.

DETAILED DESCRIPTION OF PREFERRED EMBODIMENTS OF THE INVENTION

Figure 1:
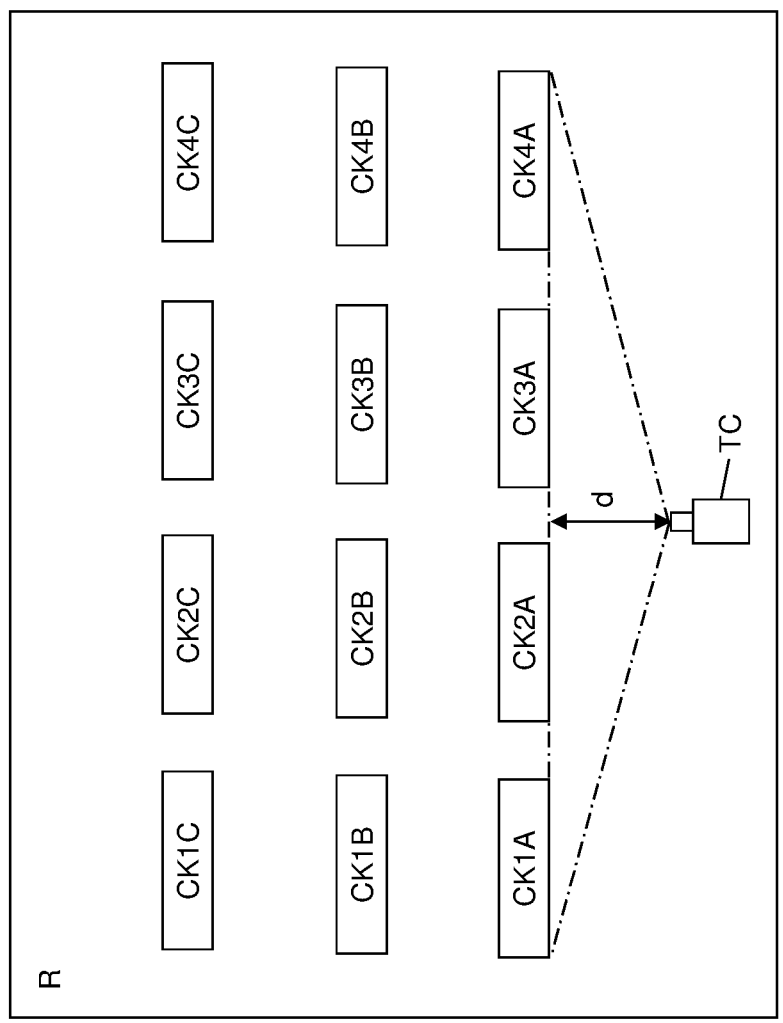
FIG. 1 is a schematic top view of a Data Center.

FIG. 1 is a top view of a room R. The room R may be a Data Center. In the room R there are several racks CK arranged in rows and comprising computing and/or telecommunication apparatuses, such as e.g. servers, routers, switches, and the like. In particular, in the room R of FIG. 1, there are provided three rows (from A to C) of four racks. The racks of the first row A are designated as CK1A, CK2A, CK3A and CK4A, and the other racks of the second and third rows are designated in a similar way.

Moreover, in FIG. 1 a thermographic camera TC is shown, such a camera being capable of acquiring a thermographic scan of a surface inside the room R. Such a surface may comprise front/rear/side portions of the apparatuses located in the racks. In the following it will be assumed, for sake of non limiting example, that the thermographic camera TC acquires thermographic scans comprising the front portions of the apparatuses in the first row of racks CK1A, CK2A, CK3A and CK4A, as represented in FIG. 1. FIG. 1 also shows a schematic representation of the field of view (FOV) of the thermographic camera TC as the area which is visible by the thermographic camera TC at a given distance d from the racks. In the following, the surfaces that are visible by the thermographic camera TC within such area will be referred to as "survey surface SV". The survey surface may comprise rack front surfaces which lay on a single plane or on more than one plane. In other words, the front surfaces of the racks could belong to one (vertical) plane (as it is shown in FIG. 1) or to several (vertical) planes.

The thermographic camera TC may comprise a matrix of infrared sensors, such as microbolometers. Each sensor typically senses the temperature of one pixel in the survey surface SV. The number of sensors of the camera may be e.g. 160×120 or 320×240. The measurement error of each sensor may be e.g. equal to about ±2° C.

Figure 2:
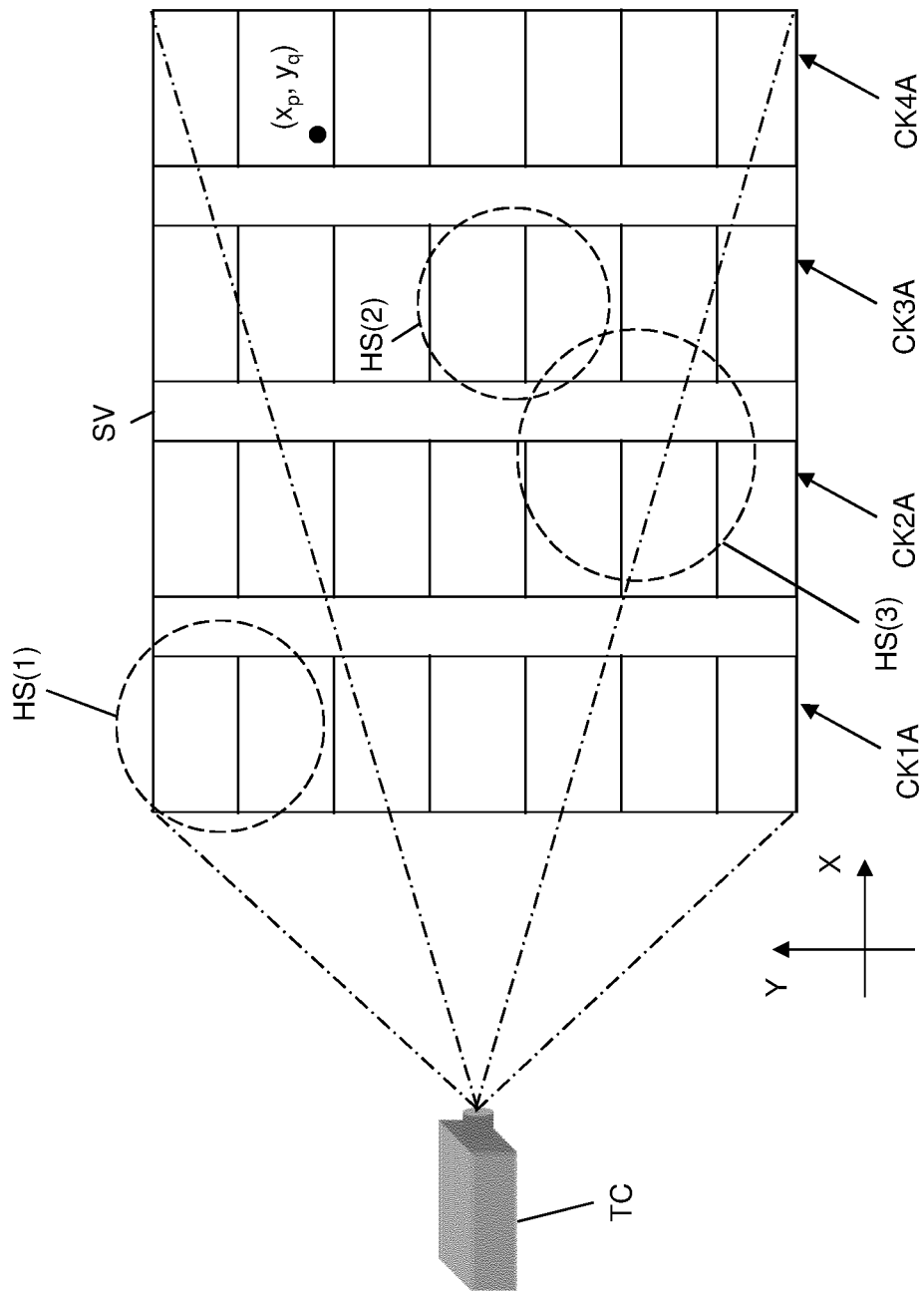
FIG. 2 is a front view of a row of racks within the Data Center of FIG. 1.

FIG. 2 is a front view of the racks of the first row CK1A, CK2A, CK3A and CK4A. In particular, it shows the survey surface SV viewed by the thermographic camera TC comprising the front portions of the apparatuses in the first row of racks CK1A, CK2A, CK3A and CK4A.

According to embodiments of the method of the present invention, a first thermographic scan of the survey surface SV is taken. FIG. 2 schematically shows three areas HS(1), HS(2) and HS(3) of the survey surface SV wherein the temperature is higher than a predefined threshold. The remaining area of the survey surface SV, for the described embodiment, is deemed to be at a temperature lower than the predefined threshold. The areas HS(1), HS(2) and HS(3) may correspond to heat sources within the survey surface SV. The heat sources HS may be, for instance, the cooling grids of the apparatuses mounted in the rack(s) comprised within the survey surface SV.

Figure 3:
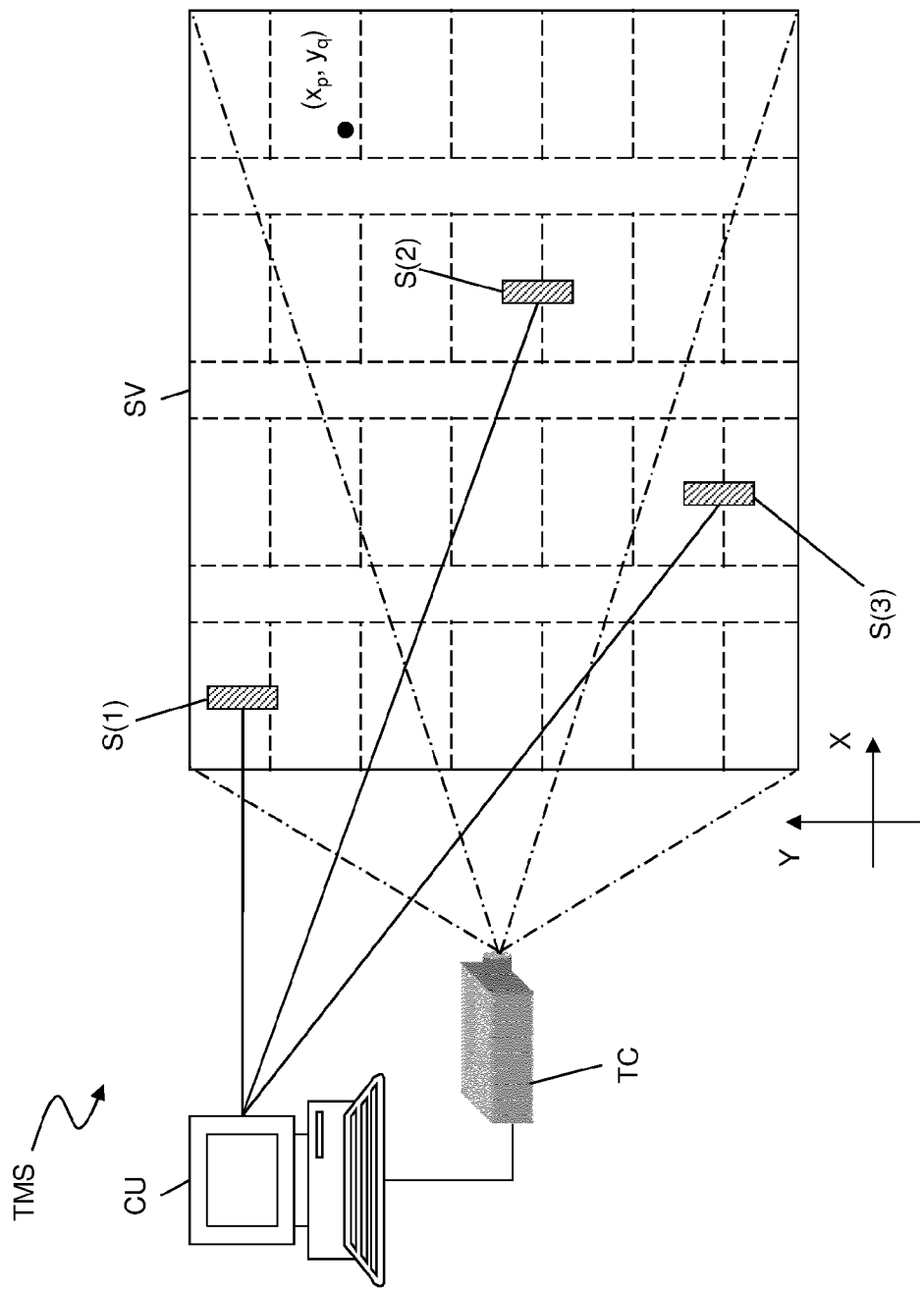
FIG. 3 shows a temperature monitoring system according to an embodiment of the present invention.

According to embodiments of the present invention, temperature sensors are arranged in specific positions of the survey surface SV. As represented in FIG. 3, in particular, one or more temperature sensors S(1), S(2), S(3) are arranged within each area HS(1), HS(2) and HS(3). For simplicity of the present description, a single temperature sensor S(1), S, S(3) is arranged within each area HS(1), HS(2) and HS(3). According to alternative embodiments, the temperature sensors S(1), S(2), S(3) may be in any number and they may be arranged in different positions with respect to the areas HS(1), HS(2) and HS(3). Each temperature sensor S(1), S(2), S(3) may comprise, for instance, a thermocouple or an NTC (Negative Temperature Coefficient) thermistor.

The temperature sensors S(1), S(2), S(3) are connected to a control unit CU. The connection between the control unit CU and each of the temperature sensors S(1), S(2), S(3) may be a wired connection or a wireless connection. The temperature sensors S(1), S(2), S(3) and the control unit CU are comprised in a temperature monitoring system TMS.

The temperature monitoring system TMS described above is configured to implement a method for monitoring the temperature on the survey surface SV, as it will be described in greater detail herein after with reference to the flow charts of FIGS. 4 and 5.

Figure 4:
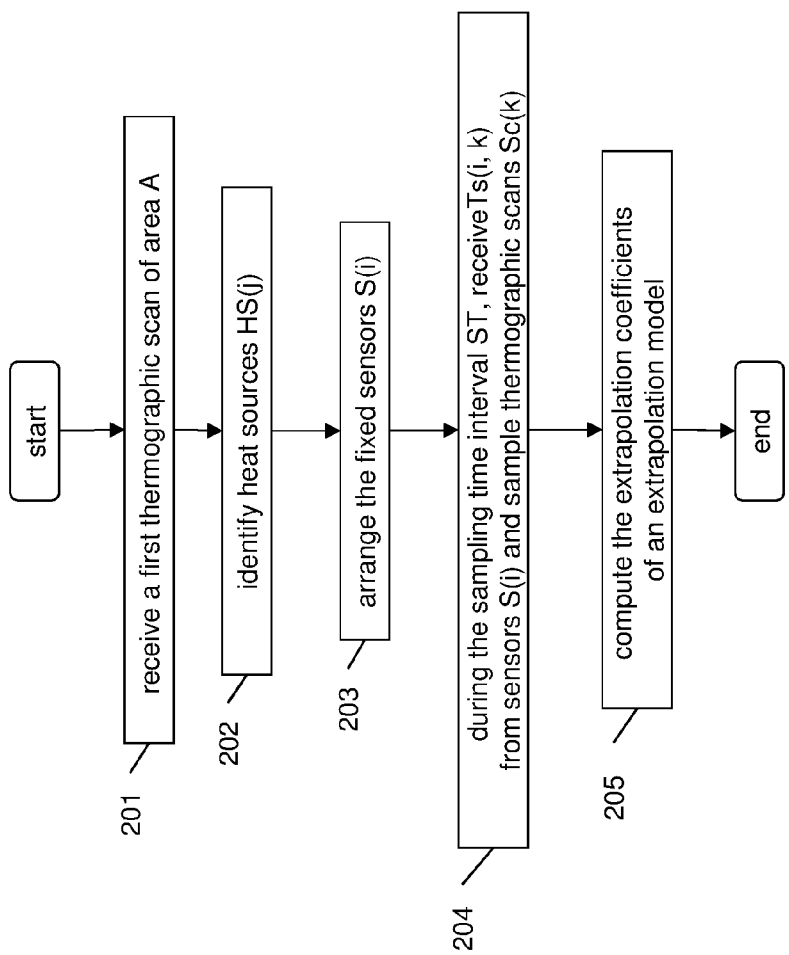
FIG. 4 shows a flow chart of the initialization of the system of FIG. 3, according to an embodiment of the present invention.

FIG. 4 shows the steps of an initialization of the temperature monitoring system TMS.

During step 201, the control unit CU of the temperature monitoring system TMS receives the first thermographic scan of the survey surface SV, on the basis of which, during step 202, it identifies the heat sources HS comprised within the survey surface SV, as described above. At step 203, the temperature sensors S are arranged in the room R at positions corresponding to the locations of the heat sources HS identified at step 202.

Alternatively, the temperature sensors S may be arranged at different positions. For instance, steps 201 and 202 may be skipped and the temperature sensors may be arranged irrespective of the fact that heat sources (as defined above) are actually present within the room R. For instance, an alternative arrangement may provide one temperature sensor per rack. Moreover, one or more of the temperature sensors S may be already present within the room R before the initialization of the temperature monitoring system TMS.

It will be assumed, in the following of the present description, that during the initialization of the temperature monitoring system TMS, each considered thermographic scan is acquired by means of the thermographic camera TC connected to the control unit CU and that the thermographic camera TC is capable of sensing a two-dimensional matrix of temperature values of dimensions P×Q which comprises P×Q temperature values of a discrete set of P×Q pixels centered at points of coordinates $(x_p, y_q)$, $p=1, \ldots, P$, $q=1, \ldots, Q$ (such coordinates being the coordinates of the point in the two-dimensional plane identified by the axes X and Y shown in FIGS. 2 and 3 and having its center e.g. at the lower left corner of the survey surface SV) in the survey surface SV. For example, the matrix of temperature values may have dimensions 320×240 and therefore it may comprise the temperature values of 76800 pixels of the survey surface SV. In the following description, a point in space of coordinates $(x_p, y_q)$ will be indicated as, simply, "point $(x_p, y_q)$".

During the successive step 204, the control unit CU preferably defines a sample collection period SP during which the control unit CU will receive samples of the temperature sensed by each temperature sensor S(1), S(2), S(3) within the survey surface SV and, in the meantime, respective sample thermographic scans of the survey surface SV, as it will be described in greater detail herein after.

The sample collection period SP is preferably determined on the basis of a preliminary evaluation on how the temperature may evolve in time within the survey surface SV. In particular, the duration of the sample collection period SP is chosen so that during such interval the temperature in the survey surface SV, in particular at the heat sources HS, is comprised within the largest possible temperature range. The minimum value and the maximum value of such range are dependent on the different working conditions of the apparatuses (i.e. the heat sources HS) comprised within the survey surface SV. This advantageously allows increasing the accuracy of the method for monitoring the temperature, as it will be explained in the following. In case the surface SV comprises one or more rows of racks, the sample collection period SP is determined on the basis of the operation profiles of the apparatuses comprised within the rack(s). For instance, a server may be switched on during the day and it may execute a number of applications which is variable during the day according to the number of users connected thereto. This server may be switched off during the night. In such a case, the temperature at the cooling grid of the server may reach a maximum value during the day and a minimum value during the night. The duration of the sample collection period SP may therefore be chosen to be equal to one day, such that during the sample collection period SP the variation of the temperature relating to that heat source (the server) is as large as possible.

During step 204, the control unit CU preferably receives the temperature values sensed by the temperature sensors S at a number K of sampling time instants $t_k$, $k=0, 1, 2, \ldots$, K of the sample collection period SP. Preferably, the sampling time instants $t_k$ are uniformly spaced in time during the sample collection period SP. The temperature values are sensed by the temperature sensors at a frequency that depends on the time that each sensor takes to react to a new temperature value and on the range of variation of the temperature at the sensor. Typically, for a wired sensor the frequency depends only on the range of variation of the temperature and therefore the interval between two consecutive time instants $t_k$ may range from tenths of a second to few minutes. In case of wireless sensors, the frequency depends on the duration of the battery with which the sensors are powered and the interval between two consecutive time instants $t_k$ is chosen accordingly, being typically of few, e.g. 5, minutes.

Figure 6:
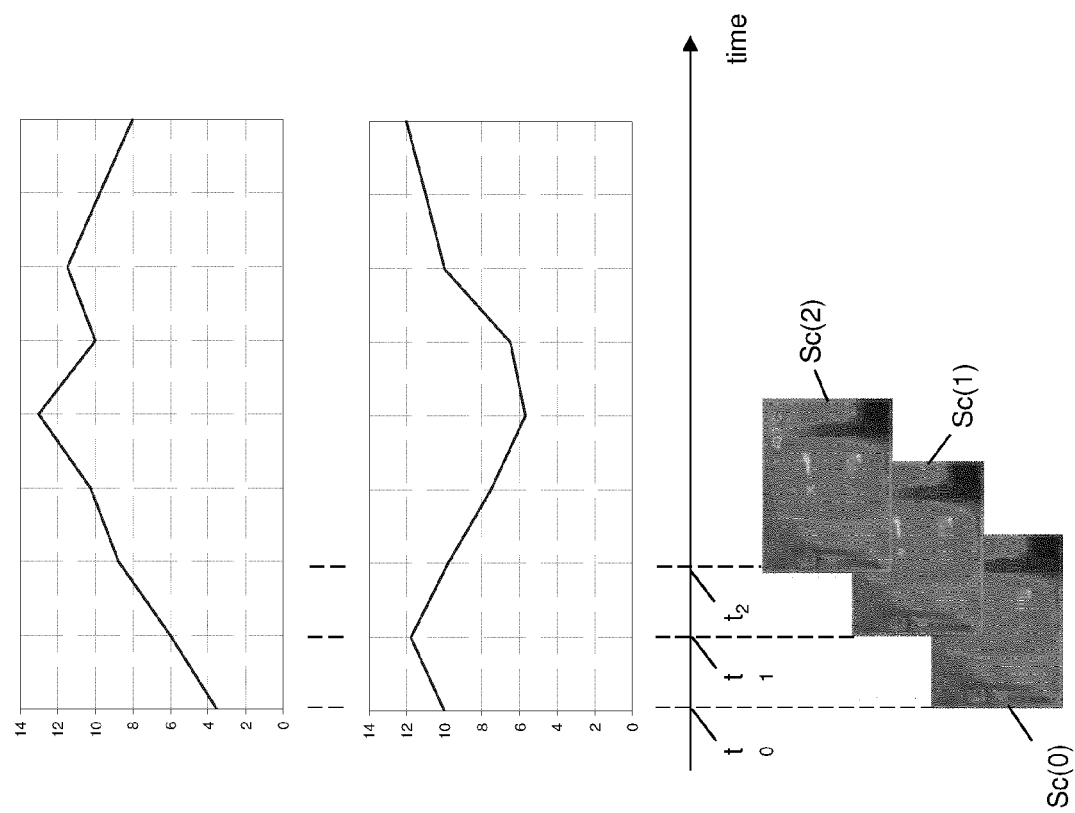
FIG. 6 shows two exemplary graphs relating to the time-varying temperature sensed by two temperature sensors of the system of FIG. 3, and some corresponding exemplary thermographic scans.

FIG. 6 shows, in its upper part, two exemplary graphs showing the temperature (in ° C.) sensed by two temperature sensors S(1) and S(2) at the sampling time instants $t_0, t_1, t_2$ and so on.

Furthermore, during step 204, the control unit CU preferably receives, at each sampling time instant $t_k$, a corresponding sample thermographic scan Sc(k), $k=0, 1, \ldots, K$ of the survey surface SV. As mentioned above, the sample thermographic scans Sc(k) are preferably acquired by means of a thermographic camera connected to the control unit CU. In FIG. 6, three grayscale images are shown, which are indicative of three successive thermographic scans Sc(0), Sc(1) and Sc(2) acquired at the sampling time instants $t_0$, $t_1$ and $t_2$, respectively.

Therefore, during step 204, the control unit CU preferably stores, at each sampling time instant $t_k$, the following information:

- a set of N temperature values Ts(i, k), i=1, ..., N sensed by a number of N sensors S(i), wherein each of such temperature values is indicative of the temperature reached by the heat source HS(i) associated to the sensor S(i); and
- a corresponding sample thermographic scan Sc(k) comprising a two-dimensional matrix of P×Q temperature values Tc(p, q, k), p=1, ..., P, q=1, ..., Q acquired by the thermographic camera at the points $(x_p, y_q)$ of the survey surface SV.

Then, during step 205, starting from the information cited above, the control unit CU preferably computes a set of extrapolation coefficients of an extrapolation model for deriving a further thermographic scan from the temperature values Ts(i, k) sensed by the temperature sensors S(i). In particular, during step 205, the control unit CU defines a set of mathematical relations connecting the temperatures sensed by the temperature sensors S(i) at the points $(x_p, y_q)$ of the survey surface SV to the corresponding temperatures comprised in the sample thermographic scans Sc(k). As it will be described in greater detail herein after, once these relations are defined and the initialization operation ends, when the temperature monitoring system TMS is made to operate, the control unit CU will be capable to derive a thermographic scan of the survey surface SV starting from the temperatures sensed by the temperature sensors S(i) alone, without using any other measurement instrumentation, such as the thermographic camera TC. In order to do so, the control unit CU will simply apply to the temperatures sensed by the temperature sensors S(i) the extrapolation model, i.e. it will apply to the temperatures sensed by the temperature sensors S(i) the mathematical relations cited above, which will provide corresponding temperatures of a "virtual" thermographic scan.

According to a first embodiment of the present invention, for computing the extrapolation coefficients cited above it is assumed that the heat sources HS(i) are independent heat sources. This means that within the survey surface SV the temperature of each point $(x_p, y_q)$ is affected by a single heat source HS(i), i.e. by the heat source HS(i) closest to that point. For instance, referring to the point $(x_p, y_q)$ shown in FIG. 2, it is assumed that its temperature is affected only by the heat source HS(2). According to this embodiment, during step 205, the control unit CU preferably divides each sample thermographic scan Sc(k) into a number of sub-matrices corresponding to the number N of heat sources HS(i). In particular, the control unit CU preferably identifies, for each heat source HS(i), the sub-matrix of the temperature values sensed by the thermographic camera at the points $(x_p, y_q)$ whose temperature is affected only by the heat source HS(i) (herein after, the set of such points $(x_p, y_q)$ will be designated as "domain of the heat source HS(i)").

Therefore, the control unit CU, at each sampling time instant $t_k$ and for each heat source HS(i), is provided with the following information:

- the temperature value Ts(i, k) sensed by the temperature sensor S(i) located at the heat source HS(i); and
- the sub-matrix of the sample thermographic scan Sc(k) relative to the temperature values Tc(h, w, k), h=1, ..., H, w=1, ..., W, wherein H≤P e W≤Q, sensed by the thermographic camera at the points $(x_h, y_w)$ belonging to the domain of the heat source HS(i).

Figure 7A:
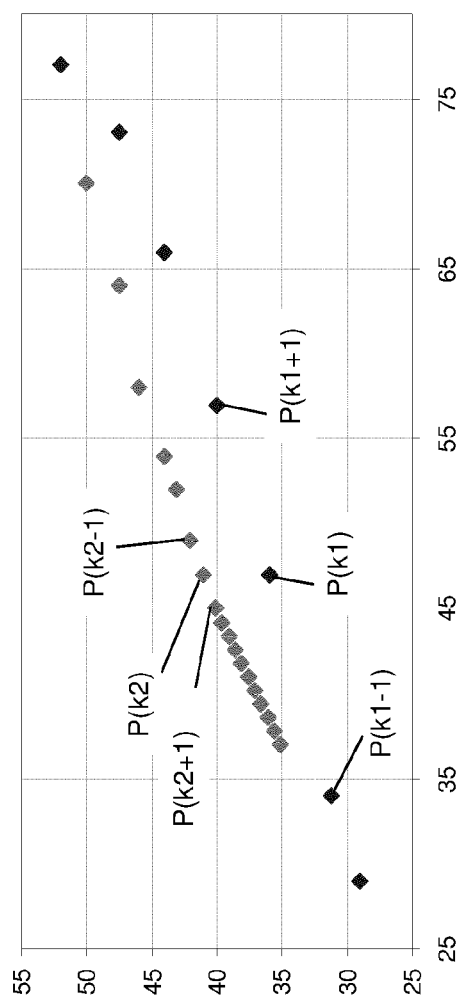
FIGS. 7a and 7b show, respectively, a graph with temperature data and the same graph in which a linear interpolation curve is superimposed to the data.

Then, the control unit CU, for each heat source HS(i) and for each point $(x_h, y_w)$ belonging to its domain, preferably associates the temperature values Tc(h, w, k) of the sample thermographic scans Sc(k) related to point $(x_h, y_w)$ and acquired at the sampling time instants $t_k$ to the corresponding temperature values Ts(i, k) sensed by the temperature sensor S(i) associated to the heat source HS(i) at the same sampling time instants $t_k$. FIG. 7a shows a graph of data points indicative of the temperature values. This graph shows the temperature values Tc(h, w, k) (in ° C.) of the sample thermographic scans Sc(k) acquired at the discrete sampling time instants $t_k$ during the sample collection period SP at point $(x_h, y_w)$ of the domain of the heat source H(i), as a function of the corresponding temperature values Ts(i, k) (in ° C.) sensed by the temperature sensor S(i) associated to the heat source HS(i) at the same discrete sampling time instants $t_k$. Each data point in the graph of FIG. 7a corresponds to a couple of temperature values Tc(h, w, k) and Ts(i, k)

The control unit CU preferably processes the temperature values Tc(h, w, k) and Ts(i, k) detected at point $(x_h, y_w)$ at the sampling time instants $t_k$ and determines if such values belong to one or more different thermal dynamics. In the following, the expression "thermal dynamics" will designate a trend in the temperature variation as a function of time. Indeed, the temperature at each point $(x_h, y_w)$ in the survey surface SV may increase, decrease or remain constant in time.

In particular, the control unit CU, starting from a graph as that shown in FIG. 7a, determines if the data points may be grouped in one or more sub-sets of data points belonging to different thermal dynamics and, in particular, according to the fact that the temperature is increasing, decreasing or remaining at a constant value. In particular, the control unit CU determines if, at point $(x_h, y_w)$, during the sample collection period SP, there exist one or more temperature values Ts(i, k) sensed by the temperature sensor S(i), to each of which at least two different temperature values Tc(h, w, k) sensed by the thermographic camera correspond. In other words, the control unit CU determines if in at least two distinct sampling time instants $t_{k1}$ and $t_{k2}$ the temperature sensor S(i) senses a same temperature value Ts(i, k1)=Ts(i, k2), while in the same sampling time instants $t_{k1}$ and $t_{k2}$ the thermographic camera acquires two different temperature values Tc(h, w, k1)≠Tc(h, w, k2). Such a situation is represented in FIG. 7a by, for example, the data points indicated as P(k1) and P(k2). Therefore, in the situation represented in FIG. 7a, the control unit CU determines that two different thermal dynamics are present, i.e. a first thermal dynamics (herein after indicated as "heating dynamics") according to which the temperature at point $(x_h, y_w)$ increases or remains constant, and a second thermal dynamics (herein after indicated as "cooling dynamics") according to which the temperature at point $(x_h, y_w)$ decreases. Moreover, for each data point as those shown in FIG. 7a, the control unit CU preferably compares the temperature value Ts(i, k) sensed by the temperature sensor S(i) at the sampling time instant $t_k$ with the temperature values sensed by the same sensor S(i) at the previous sampling time instant $t_{k-1}$ and at the successive time instant $t_{k+1}$ and determines if the data point belongs to the heating dynamics or to the cooling dynamics of the temperature at point $(x_h, y_w)$.

For example, referring again to the graph of FIG. 7a, the control unit CU compares the temperature value Ts(i, k1) sensed by the temperature sensor S(i) at the sampling time instant $t_{k1}$ (data point P(k1) in FIG. 7a) with the temperature values Ts(i, k1−1) and Ts(i, k1+1) sensed by the same sensor at the sampling time instants $t_{k1-1}$ (data point P(k1−1) in FIG. 7a) and $t_{k1+1}$ (data point P(k1+1) in FIG. 7a). Then, since Ts(i, k1−1)<Ts(i, k1)<Ts(i, k1+1), the control unit CU determines that the data point P(k1) belongs to the heating dynamics. Moreover, the control unit compares the temperature value Ts(i, k2) sensed by the temperature sensor S(i) at the sampling time instant $t_{k2}$ (data point P(k2) in FIG. 7a) with the temperature values Ts(i, k2−1) and Ts(i, k2+1) sensed by the same sensor at the sampling time instants $t_{k2-1}$ (data point P(k2−1) in FIG. 7a) and $t_{k2+1}$ (data point P(k2+1) in FIG. 7a). Then, since Ts(i, k2+1)<Ts(i, k2)<Ts(i, k2−1), the control unit CU determines that the data point P(k1) belongs to the cooling dynamics.

Once the thermal dynamics have been identified (i.e. the presence of a single thermal dynamics or of different thermal dynamics within the sample collection period SP) and the data points associated to their respective thermal dynamics, the control unit CU preferably determines different interpolations for the data points belonging to different dynamics. In the following it will be assumed that, as represented in FIG. 7a, the data points may belong to a heating dynamics or a cooling dynamics. Then, the control unit CU preferably determines a first interpolation of the data points belonging to heating dynamics and a second interpolation of the data points belonging to cooling dynamics. This way, indeed, a mathematical relation is defined which connects the temperatures Tc(h, w, k) of the sample thermographic scans Sc(k) and the temperatures Ts(i, k) sensed by the temperature sensors S(i).

Figure 7B:
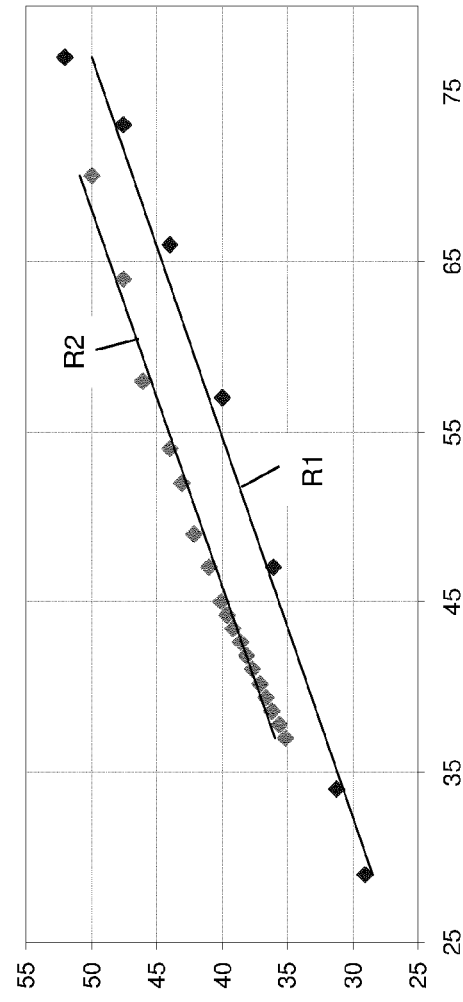

In order to do so, the control unit CU preferably interpolates the data points belonging to heating dynamics and the data points belonging to cooling dynamics with respective polynomials. In FIG. 7b, for instance, the data points belonging to the two thermal dynamics are interpolated with respective polynomials of degree 1 (linear interpolation), represented by the straight lines R1 and R2 which are superimposed to the data points of the graph of FIG. 7a. In particular, the straight line R1 interpolates the data points belonging to the heating dynamics and the straight line R2 interpolates the data points belonging to the cooling dynamics. The degree of the polynomials used to interpolate the data points belonging to the two different dynamics is preferably equal but it may also be different. In the following description, for sake of simplicity, it will be assumed that the degree of both polynomials is equal to 1. In such a case, the straight lines used to interpolate the data points are represented by the following equations:

$$R1: Tc(h,w,k) = m_{i1}(h,w)Ts(i,k) + q_{i1}(h,w) \quad [1]$$

$$R2: Tc(h,w,k) = m_{i2}(h,w)Ts(i,k) + q_{i2}(h,w) \quad [2]$$

wherein $m_1(h, w, i)$ is the slope of the straight line R1 (interpolating the data points belonging to the heating dynamics at point $(x_h, y_w)$ due to the heat source HS(i)), $q_1(h, w, i)$ is the y-intercept of the straight line R1, $m_2(h, w, i)$ is the slope of the straight line R2 (interpolating the data points belonging to the cooling dynamics at point $(x_h, y_w)$ due to the heat source HS(i)), and $q_2(h, w, i)$ is the y-intercept of the straight line R2.

Then, the control unit CU preferably defines a first extrapolation coefficient matrix $A_{i1}$, a second extrapolation coefficient matrix $B_{i1}$, a third extrapolation coefficient matrix $A_{i2}$ and a fourth extrapolation coefficient matrix $B_{i2}$ as follows. The first extrapolation coefficient matrix $A_{i1}$ comprises the slopes of the straight lines R1 which interpolate the data point belonging to heating dynamics for all the points $(x_h, y_w)$ comprised within the domain of the heat source HS(i):

$$A_{i1} = \begin{bmatrix} m_{i1}(0,0) & \ldots & m_{i1}(0,W) \\ \ldots & & \\ m_{i1}(H,0) & \ldots & m_{i1}(H,W) \end{bmatrix}. \quad [3]$$

The second extrapolation coefficient matrix $B_{i1}$ comprises the y-intercepts of the straight lines R1 which interpolate the data point belonging to heating dynamics for all the points $(x_h, y_w)$ comprised within the domain of the heat source HS(i):

$$B_{i1} = \begin{bmatrix} q_{i1}(0,0) & \ldots & q_{i1}(0,W) \\ \ldots & & \\ q_{i1}(H,0) & \ldots & q_{i1}(H,W) \end{bmatrix}. \quad [4]$$

The third extrapolation coefficient matrix $A_{i2}$ comprises the slopes of the straight lines R2 which interpolate the data point belonging to cooling dynamics for all the points $(x_h, y_w)$ comprised within the domain of the heat source HS(i):

$$A_{i2} = \begin{bmatrix} m_{i2}(0,0) & \ldots & m_{i2}(0,W) \\ \ldots & & \\ m_{i2}(H,0) & \ldots & m_{i2}(H,W) \end{bmatrix}. \quad [5]$$

The fourth extrapolation coefficient matrix $B_{i2}$ comprises the y-intercepts of the straight lines R2 which interpolate the data point belonging to cooling dynamics for all the points $(x_h, y_w)$ comprised within the domain of the heat source HS(i):

$$B_{i2} = \begin{bmatrix} q_{i2}(0,0) & \ldots & q_{i2}(0,W) \\ \ldots & & \\ q_{i2}(H,0) & \ldots & q_{i2}(H,W) \end{bmatrix}. \quad [6]$$

Therefore, at the end of step 205, the control unit CU stores, for each heat source HS(i), two extrapolation coefficient matrices relating to heating dynamics and two extrapolation coefficient matrices relating to cooling dynamics.

It is to be noted that interpolating the data points with polynomials of degree 1 is merely exemplary and not limiting. Indeed, during step 205, the control unit CU may also use polynomials of higher degree. In such a case, each curve used to interpolate the data points is defined by a number of coefficients higher than 2. For instance, if the degree of the polynomials is 2, the coefficients defining each interpolating curve are 3. Therefore, in general, the control unit CU, during step 205, defines, for each heat source HS(i) and for each thermal dynamics related to such a source, a number of extrapolation coefficient matrices equal to the number of coefficients that define the curve used for the interpolation, or, in other words, equal to the degree of the polynomials used for the interpolation plus 1.

The choice of the degree of the polynomials for interpolating the data points may be determined so that the error of the resulting approximation (i.e. the average distance between the data points and the curve interpolating them) is lower than an error of the measurement instrumentation, i.e. of the thermographic camera. Such an error may be equal to ±2° C., as mentioned above.

According to a second embodiment of the present invention, for determining the extrapolation coefficients cited above it is assumed that the heat sources HS(i) are not independent one from another. In this case, in each point $(x_p, y_q)$ within the survey surface SV, the temperature is affected by all the heat sources HS(i).

Figure 8:
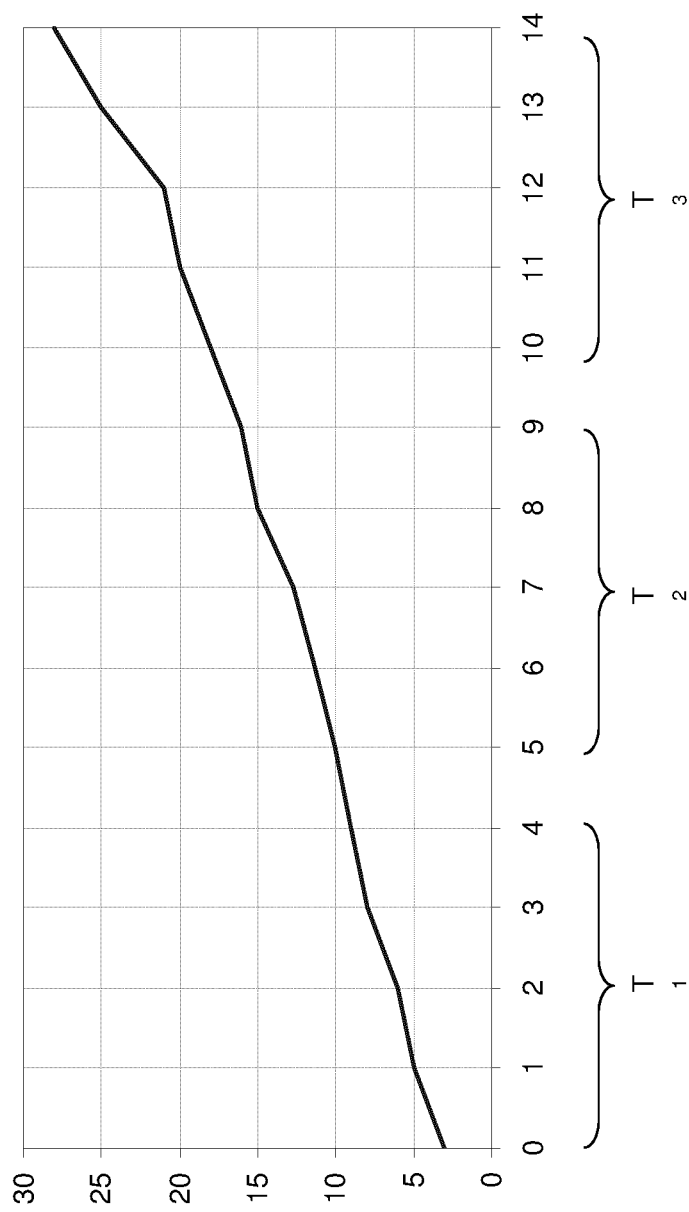
FIG. 8 shows a further exemplary graph of the temperature sensed by a temperature sensor of the system of FIG. 3.

As already described above, during step 204, the control unit CU stores, at each sampling time instant $t_k$, the following information:
- a set of N temperature values Ts(i, k), i=1, . . . , N sensed by the N sensors S(i), wherein each of such temperature values is indicative of the temperature reached by the heat source HS(i) associated to the sensor S(i). For instance, FIG. 8 shows the exemplary temperature values (in ° C.) sensed by a temperature sensor S(i) as a function of time, during the sample collection period SP (the graph reports, in abscissa, the indices k of the discrete sampling time instants $t_k$); and
- a corresponding sample thermographic scan Sc(k) comprising a two-dimensional matrix of P×Q temperature values Tc(p, q, k), p=1, . . . , P, q=1, . . . , Q acquired by the thermographic camera at points $(x_p, y_q)$ of the survey surface SV.

Then, during step 205, starting from the information cited above, the control unit CU preferably computes the extrapolation coefficients for deriving a thermographic scan from the temperature values Ts(i, k) sensed by the temperature sensors S(i), as it will be described in greater detail herein after.

In particular, the control unit CU defines a number K/N of sub-intervals $T_n$, n=1, . . . , K/N of the sampling time interval TS (wherein K is the number of sampling time instants $t_k$ within the sample collection period SP and N is the number of heat sources HS(i)). Each sub-interval $T_n$ comprises a number N of sampling time instants $t_k$. FIG. 8 shows the temperature Ts(k, i) sensed by the temperature sensor S(i) at 15 sampling time instants $t_k$, and three sub-intervals of the sample collection period SP are indicated $T_1$, $T_2$ and $T_3$, each sub-interval comprising N=5 sampling time instants $t_k$.

Further, the control unit N defines, for each point of coordinates $(x_p, y_q)$ in the surface SV, a number K/N of systems of linear equations, each one comprising N equations involving N variables, as in the following:

$$\begin{cases} Tc(k1(n)) = \begin{array}{l} c1(n) \cdot Ts(1, k1(n)) + c2(n) \cdot \\ Ts(2, k1(n)) + \ldots + \\ cN(n) \cdot Ts(N, k1(n)) \end{array} \\ Tc(k2(n)) = \begin{array}{l} c1(n) \cdot Ts(1, k2(n)) + c2(n) \cdot \\ Ts(2, k2(n)) + \ldots + \\ cN(n) \cdot Ts(N, k2(n)) \end{array} \\ \ldots \\ Tc(kN(n)) = \begin{array}{l} c1(n) \cdot Ts(1, kN(n)) + c2(n) \cdot \\ Ts(2, kN(n)) + \ldots + \\ cN(n) \cdot Ts(N, kN(n)) \end{array} \end{cases} \quad [7]$$

wherein: indices p and q have been omitted for conciseness, Tc(k1(n)), . . . , Tc(kN(n)) are the temperature values at point $(x_p, y_q)$ comprised in the sample thermographic scans Sc(k1 (n)), . . . , Sc(kN(n)) acquired in N sampling time instants $t_{k1(n)}, \ldots, t_{kN(n)}$ within the sub-interval $T_n$ of the sample collection period SP (see FIG. 6), Ts(1, k1(n)), . . . , Ts(1, kN(n)) are the temperature values sensed by the temperature sensor S(1) at the sampling time instants $t_{k1(n)}, \ldots, t_{kN(n)}$, Ts(2, k1(n)), . . . , Ts(2, kN(n)) are the temperature values sensed by the temperature sensor S(2) at the sampling time instants $t_{k1(n)}, \ldots, t_{kN(n)}$, Ts(N, k1(n)), . . . , Ts(N, kN(n)) are the temperature values sensed by the temperature sensor S(N) at the sampling time instants $t_{k1(n)}, \ldots, t_{kN(n)}$, and c1(n), . . . , cN(n) are N extrapolation coefficients relating to the sub-interval $T_n$. The coefficients c1(n), . . . , cN(n) are the variables of the system of linear equations.

In each system of linear equations, N mathematical relations are defined connecting the temperatures Tc(k1(n)), . . . , Tc(kN(n)) of the sample thermographic scans Sc(k) and the temperatures sensed by the temperature sensors S(i).

During step 205, the control unit CU preferably solves the systems of linear equations as defined above and computes an array of extrapolation coefficients {c1(n), . . . , cN(n)} for each point $(x_p, y_q)$ of the surface SV and for each sub-interval $T_n$ of the sample collection period SP Then, the control unit CU, for each point $(x_p, y_q)$ of the surface SV, preferably computes an array of average extrapolation coefficients {c1*, . . . , cN*} by computing the average of the arrays of extrapolation coefficients computed for the sub-intervals $T_n$ as described above.

In particular, the array of average extrapolation coefficients {c1*, . . . , cN*} is computed as follows:

$$c1^* = \frac{\sum_{n=1}^{K/N} c1(n)}{K/N}, \quad [8]$$

$$c2^* = \frac{\sum_{n=1}^{K/N} c2(n)}{K/N}, \ldots, cN^* = \frac{\sum_{n=1}^{K/N} cN(n)}{K/N}$$

wherein K/N is the number of sub-intervals $T_n$.

Therefore, at the end of step 205, the control unit CU preferably stores, for each point $(x_p, y_q)$ of the surface SV, an array of average extrapolation coefficients {c1*, . . . , cN*}.

In the light of the above, according to both the first embodiment and the second embodiment of the present invention, during step 205 the control unit CU computes a set of extrapolation coefficients: according to the first embodiment, the extrapolation coefficients are the elements comprised within the first, second, third and fourth extrapolation coefficient matrices $A_{i1}$, $B_{i1}$, $A_{i2}$, $B_{i2}$ of equations [3], [4], [5] and [6] above; according to the second embodiment, the extrapolation coefficients are the elements of the array of average extrapolation coefficients {c1*, . . . , cN*}. The extrapolation coefficients are then used during the operation of the temperature monitoring system TMS for extrapolating, starting from the temperatures sensed by the temperature sensors S(i) within the surface SV, a "virtual" thermographic scan of the survey surface SV, as it will be described in greater detail herein after Such a scan is "virtual" since it is obtained without using further temperatures sensors, such as the thermographic camera used during the initialization operation. This advantageously allows obtaining an accurate thermographic scan while reducing the costs.

The extrapolation models described above with reference to the first embodiment and the second embodiment of the present invention are merely exemplary. Indeed, to define the set of mathematical relations connecting the temperature of the sample thermographic scans and the temperatures sensed by the temperature sensors during the initialization operation, it is possible to use further extrapolation models allowing to extrapolate a thermographic scan from the temperatures of the fixed sensors. Examples of further extrapolation models are models based on the use of neural networks and models based on the use of space-frequency transformations.

Figure 5:
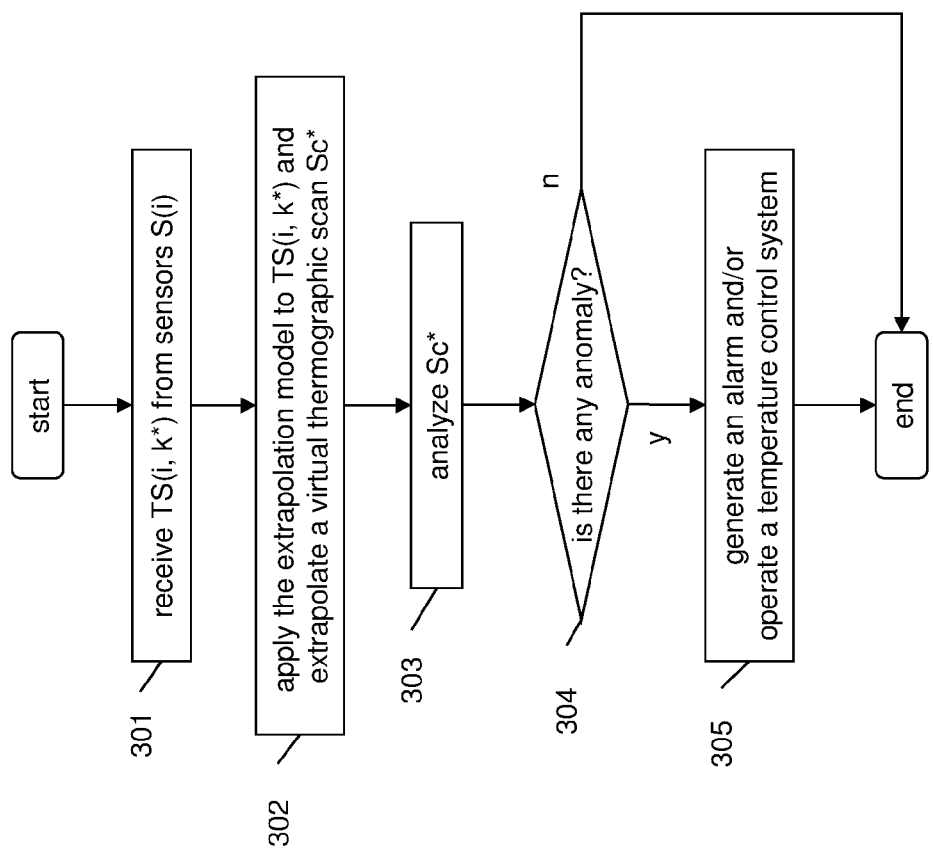
FIG. 5 shows a flow chart of the operation of the system of FIG. 3, according to an embodiment of the present invention.

FIG. 5 shows a flow chart illustrating the steps of the operation of the temperature monitoring system TMS of FIG. 1. During step 301, the control unit CU, at a time instant $t_k*$, preferably receives N temperature values $Ts(i, k*)$, $i=1, \ldots, N$ sensed by the N temperature sensors $S(i)$, $i=1, \ldots, N$ associated to the N heat sources $HS(i)$ within the survey surface SV. Then, during step 302, the control unit CU preferably processes the received temperature values $Ts(i, k*)$ by using the extrapolation coefficients computed during step 205 of the initialization described above.

As a result of the processing, the control unit CU extrapolates a virtual thermographic scan Sc* of the survey area.

In particular, according to the first embodiment of the present invention (i.e. by assuming that the heat sources HS(i) are independent), the control unit CU preferably processes the received temperature values $Ts(i, k*)$ by using the extrapolation coefficient matrices $A_{i1}$, $B_{i1}$, $A_{i2}$, $B_{i2}$ of equations [3], [4], [5] and [6] above. Then the control unit CU preferably extrapolates a number N of virtual scans Sc*(i), each of them being related to the domain of a respective heat source HS(i).

For instance, it is assumed in the following that at time $t_{k*}$ the i-th temperature sensor S(i) associated to the i-th heat source HS(i) senses the temperature value $Ts(i, k*)$ and that the thermal dynamics is a heating dynamics. Moreover, it is assumed that during step 205 the control unit CU performed a linear interpolation of the data points (i.e. the interpolating polynomials are polynomials of degree 1). In such a case, the virtual thermographic scan Sc*(i) related to the i-th heat source is the temperature map of the points $(x_h, y_w)$, $h=1, \ldots, H$, $w=1, \ldots, W$ belonging to the domain of the i-th heat source HS(i). The virtual thermographic scan Sc*(i) is computed according to the following equation:

$$Sc*(i) = A_{i1} \cdot Ts(i,k*) + B_{i1} \quad [9]$$

wherein $A_{i1}$ is the first extrapolation coefficient matrix of equation [3] above (i.e. the matrix comprising the slopes of the straight lines interpolating the temperatures at points $(x_h, y_w)$ in the presence of heating dynamics), $Ts(i, k*)$ is the temperature value sensed by the temperature sensor S(i) at time $t_{k*}$ and $B_{i1}$ is the second extrapolation coefficient matrix of equation [4] above (i.e. the matrix comprising the y-intercepts of the straight lines interpolating the temperatures at points $(x_h, y_w)$ in the presence of heating dynamics).

According to the second embodiment of the present invention (i.e. by assuming that the heat sources HS(i) are not independent), the control unit CU preferably processes the received temperature values $Ts(i, k*)$ by using the extrapolation coefficients of the array of average extrapolation coefficients $\{c1*, \ldots, cN*\}$ defined above with reference to equation [8]. Then the control unit CU preferably extrapolates a virtual scan Sc*(i) of the survey surface SV.

For instance, it will be assumed in the following that the surface SV comprises three heat sources HS(1), HS(2) and HS(3), each being associated to a respective temperature sensor S(1), S(2) and S(3). During step 205, the control unit CU computes, for each point $(x_p, y_q)$ of the surface SV, an array of average extrapolation coefficients $\{c1*(p, q), c2*(p, q), c3*(p, q)\}$. It is assumed that, for instance, at time $t_{k*}$ the temperature sensor S(i) associated to the heat source HS(1) senses the temperature value $Ts(1, k*)$; the temperature sensor S(2) associated to the heat source HS(2) senses a temperature value $Ts(2, k*)$; and, the temperature sensor S(3) associated to the heat source HS(3) senses a temperature value $Ts(3, k*)$. In such a case, the virtual thermographic scan Sc* is the temperature map of the points $(x_p, y_q)$ belonging to the survey surface SV. The element of the virtual thermographic scan Sc* indicative of the temperature at point $(x_p, y_q)$ is computed according to the following equation:

$$Sc*(p,q) = c1*(p,q) \cdot Ts(1,k*) + c2*(p,q) \cdot Ts(2,k*) + c3*(p,q) \cdot Ts(3,k*)$$

wherein $p=1, \ldots, P$ and $q=1, \ldots, Q$.

The accuracy of the virtual thermographic scan Sc* (or scans Sc*(i) according to the first embodiment) depends of the choice of the duration of the sample collection period SP. As mentioned above, the duration of the sample collection period SP is chosen so as to comprise the interval during which the range of variation of the temperature is the largest. If, for instance, during step 301, one or more of the temperatures sensed by the temperature sensors S(i) are outside the range of variation of the temperature considered for determining the duration of the sample collection period SP (i.e. for instance the temperature sensed by the fixed sensor S(i) is higher than the maximum value sensed by the same sensor S(i) during the sample collection period SP), the virtual thermographic scan Sc* extrapolated during step 302 may be affected by errors. The more the temperatures sensed by the fixed sensors S(i) during the operation of the system TMS are different from the values sensed during the sample collection period SP, the more the errors present in the virtual thermographic scan Sc*.

Once the virtual thermographic scan Sc* (or scans Sc*(i) according to the first embodiment) is computed, it may be processed in order to obtain an image, a grayscale image or a false colors image, which may be presented to an operator by means of a display connected to the control unit CU.

The control unit CU, during step 302, may also extrapolate a set of virtual thermographic scan Sc* (or scans Sc*(i) according to the first embodiment) relating to different successive time instants.

Then, during step 303, the control unit CU preferably analyzes the thermographic scan Sc* or the image derived therefrom (in such a case by using, for instance, an image processing software, or the like) in order to identify possible anomalies of the temperature within the scan. An anomaly may be a temperature value or a group of temperature values outside a predefined temperature range, said temperature range guaranteeing the safe and correct functioning of the apparatuses present in the room. For instance, the analysis performed at step 303 may show that a heat source HS(i) within the surface SV, e.g. a server, is overheated, which may cause malfunctioning. Moreover, by analyzing virtual thermographic scans related to successive time instants, the control unit CU may check if anomalous trends of the temperature may be identified.

If during step 304 the control unit CU identifies at least one anomaly within the virtual thermographic scan Sc*, or if the control unit CU identifies an anomalous trend of the temperature within successive virtual thermographic scans, the control unit CU preferably generates an alarm signal that, in an automatic manner, may trigger the operation of a temperature control system (not shown in the drawings) connected to the control unit CU (step 305).

Alternatively, the control unit CU may play a sound operable by a loudspeaker connected to the control unit CU (not shown in the drawings), or the control unit CU may generate a video message to be displayed on a display connected to the control unit CU, in order to allow an operator to manually intervene to operate the temperature control system.

The temperature control system may comprise an apparatus for cooling the air and for orientating the cooled air, such as for instance an air conditioning apparatus. If, for instance, the analysis of the virtual thermographic scan Sc* performed at step 303 shows that a server is overheated, the temperature control system may be operated to cool the air and to direct the cooled air towards the overheated server so as to reduce its temperature. Moreover, the temperature control system may comprise a processor capable of executing a software in order to operate a software application capable of migrating some processes and applications from the overheated server towards other apparatuses by exploiting a cloud computing infrastructure. Such a software may alternatively be comprised in the control unit. As an alternative, it could be decided to move the overheated server to a different location within the same rack or another rack in the room.

Advantageously, the method for monitoring the temperature according to the present invention allows extrapolating a thermographic scan of the monitored room starting from temperature measures sensed by a small number of temperature sensors, without using other more expensive instrumentation, such as a thermographic camera. This results in a reduction of the costs for implementing the temperature monitoring system. Indeed, during the initialization described above, the control unit determines a set of mathematical relations (i.e. the extrapolation model) which connect the temperatures of sample thermographic scans to the temperatures sensed by the temperature sensors. The sample thermographic scans are acquired by means of a thermographic camera which is used only during the initialization procedure. Once the extrapolation model is computed, it is not necessary to acquire further thermographic scans since it is possible to compute virtual thermographic scans from the temperatures sensed by the temperature sensors. Therefore, advantageously, the temperature of the monitored room may be checked in a simple, low cost and accurate way. Indeed, the virtual thermographic scan comprises all the information of a "real" thermographic scan and then allows monitoring the temperature of the surfaces in a room with a high degree of accuracy. It indeed allows monitoring the temperature even when it is rapidly variable in space and time.

Finally, the operation of extrapolating the virtual thermographic scan is fast. In the presence of an anomaly in the temperature distribution on a surface within the room, which may cause malfunctioning of one or more apparatuses, it is possible to quickly compute a thermographic scan of that surface so as to quickly identify the cause of the anomaly and take adequate countermeasures. Indeed, according to the embodiments described above, the thermographic scan is obtained by simply computing sums and products of arrays and matrices, such operations being extremely fast when performed by a computer. The construction of the extrapolation model, which is a more complex operation, is advantageously performed once, before the system is made to operate and the extrapolation coefficients are stored within the control unit. Therefore, advantageously, during the operation of the system, the extrapolation coefficients have not to be computed again but they are to be simply recovered from the memory of the control unit.

The invention claimed is:

1. A method for monitoring a temperature of a survey surface in a room, the method comprising:
receiving respective temperature values from a number of temperature sensors coupled to the survey surface;
extrapolating an extrapolated thermographic scan of the survey surface by applying an extrapolation model to the received temperature values; and
monitoring the temperature of the survey surface based on the extrapolated thermographic scan.

2. The method according to claim 1, further comprising, at a number of discrete time instants belonging to a sample collection period, receiving first temperature values from the number of temperature sensors and corresponding sample thermographic scans, each of the sample thermographic scans including a matrix of second temperature values sensed at a number of pixels of the surface.

3. The method according to claim 2, further comprising computing extrapolation coefficients of the extrapolation model based on the first temperature values and the second temperature values of the corresponding sample thermographic scans.

4. The method according to claim 3, wherein the computing comprises, for each of the number of pixels, associating the pixel with a respective temperature sensor and interpolating the second temperature values corresponding to the pixel as a function of the first temperature values corresponding to the associated temperature sensor by polynomials of degree equal to or higher than 1.

5. The method according to claim 3, wherein the computing further comprises identifying a first thermal dynamics and a second thermal dynamics at the pixel and associating each of the second temperature values and the corresponding first temperature value to one of the first thermal dynamics and second thermal dynamics.

6. The method according to claim 3, wherein the computing comprises defining and solving, for each of the number of pixels, a number of systems of linear equations, each of the linear equations connecting the second temperature value corresponding to the pixel in a time instant to the number of first temperature values received from the number of temperature sensors in the time instant.

7. The method according to claim 3, further comprising receiving a first thermographic scan of the survey surface, identifying a number of areas on the survey surface, and arranging the number of temperature sensors within the areas.

8. The method according to claim 7, wherein the identifying comprises identifying a number of areas wherein a temperature is higher than a threshold.

9. The method according to claim 7, further comprising processing the extrapolated thermographic scan and detecting one or more temperature anomalies.

10. The method according to claim 9, further comprising generating an alarm signal and/or operating a temperature control system within the room to recover from the one or more temperature anomalies.

11. A temperature monitoring system for monitoring a temperature of a survey surface in a room, the system comprising:
a number of temperature sensors coupled to the survey surface; and
a controller configured to communicate with the number of temperature sensors, wherein the controller is configured to:
- receive from the number of temperature sensors respective temperature values;
- apply an extrapolation model to the received temperature values to extrapolate an extrapolated thermographic scan; and
- monitor the temperature of the room based on the extrapolated thermographic scan.

12. The temperature monitoring system according to claim 11, wherein the temperature sensor comprises a thermocouple.

13. The temperature monitoring system according to claim 11, wherein the temperature sensor comprises an NTC thermistor.

14. The temperature monitoring system according to claim 11, wherein the controller is further configured to receive at least one thermographic scan of the survey surface from a thermographic camera.

15. The temperature monitoring system according to claim 11, wherein a thermographic camera is communicatively coupled to the controller.

16. A temperature monitoring system for monitoring a temperature of a survey surface in a room, the system comprising:
- a controller configured to
  - receive respective temperature values from each of a plurality of temperature sensors coupled to the survey surface;
  - apply an extrapolation model to the received temperature values to extrapolate an extrapolated thermographic scan; and
  - monitor the temperature of the room based on the extrapolated thermographic scan.

* * * * *